United States Patent
Gembolis et al.

[11] Patent Number: 6,099,726
[45] Date of Patent: *Aug. 8, 2000

[54] STATIC DISSIPATING FILTER CARTRIDGE WITH CONDUCTIVE RESILIENT SEAL

[75] Inventors: Donald J. Gembolis, Toledo; Bruce E. Shane, Delta, both of Ohio

[73] Assignee: Parker-Hannifin Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/006,941

[22] Filed: Jan. 14, 1998

Related U.S. Application Data

[63] Continuation of application No. PCT/US96/09729, Jun. 10, 1996.
[60] Provisional application No. 60/002,432, Jul. 18, 1995.

[51] Int. Cl.[7] .............................. B01D 25/12; C02F 25/12
[52] U.S. Cl. ......................... 210/243; 210/487; 210/489; 210/493.2; 55/360; 361/215
[58] Field of Search ................................ 210/243, 416.4, 210/493.2, 483, 484, 486, 487, 489; 439/927; 277/919; 361/215; 55/358, 360; 96/17

[56] References Cited

U.S. PATENT DOCUMENTS

| | | |
|---|---|---|
| 3,186,551 | 6/1965 | Dornauf . |
| 3,933,643 | 1/1976 | Colvin et al. . |
| 4,187,179 | 2/1980 | Harms . |
| 4,834,885 | 5/1989 | Misgen et al. ..................... 210/440 |
| 4,999,108 | 3/1991 | Koch et al. . |
| 5,076,920 | 12/1991 | Danowski et al. . |
| 5,164,084 | 11/1992 | Danowski et al. . |
| 5,164,879 | 11/1992 | Danowski et al. . |
| 5,171,430 | 12/1992 | Beach et al. ........................ 210/94 |
| 5,213,882 | 5/1993 | Sassa et al. ....................... 442/414 |
| 5,229,200 | 7/1993 | Sassa et al. ........................ 442/57 |
| 5,380,432 | 1/1995 | Brandt . |
| 5,527,569 | 6/1996 | Hobson et al. ..................... 428/35.2 |
| 5,667,678 | 9/1997 | Dye et al. .......................... 210/232 |

FOREIGN PATENT DOCUMENTS

| | | |
|---|---|---|
| 0 402 657 | 12/1990 | European Pat. Off. . |
| 3325526 | 4/1985 | Germany . |
| WO 87/01301 | 3/1987 | WIPO . |
| WO 92/04097 | 3/1992 | WIPO . |

OTHER PUBLICATIONS

Copy of International Search Report for PCT Case No. PCT/US96/09729.

Primary Examiner—W. L. Walker
Assistant Examiner—Richard W. Ward
Attorney, Agent, or Firm—Christopher H. Hunter

[57] ABSTRACT

A filter apparatus (10) which dissipates static charge from fluid flowing through the apparatus has a filter housing (12) enclosing a filter element (14). The filter element includes a tubular filter media assembly (15) which incorporates a conductive structure to draw off static charge in fluid passing through the media. The tubular filter media assembly comprises an outer steel mesh support layer (24); a first intermediate layer (25) of a filtration media; a second intermediate layer (26) of a carbon material, e.g., stainless steel, nickel or carbon fiber mesh, mat or matrix; and an inner steel mesh support layer (27). The filter media assembly is pleated and disposed around a central perforated conductive tube (16). The filter media is electrically connected at one or both ends through conductive adhesive or epoxy to at least one conductive end cap (20, 22). The conductive end cap has a central opening (33, 34), and receives a portion of the grounded filter housing (50, 52), for example, an inlet tube. A conductive elastomeric O-ring seal (48, 49) is disposed between the conductive end cap and the respective portion of the filter housing extending through the end cap opening. The O-ring seal electrically connects (grounds) the conductive end cap(s) to the respective housing portion to provide a flexible ground path for carrying away static charge in the fluid passing thorough the cartridge.

55 Claims, 3 Drawing Sheets

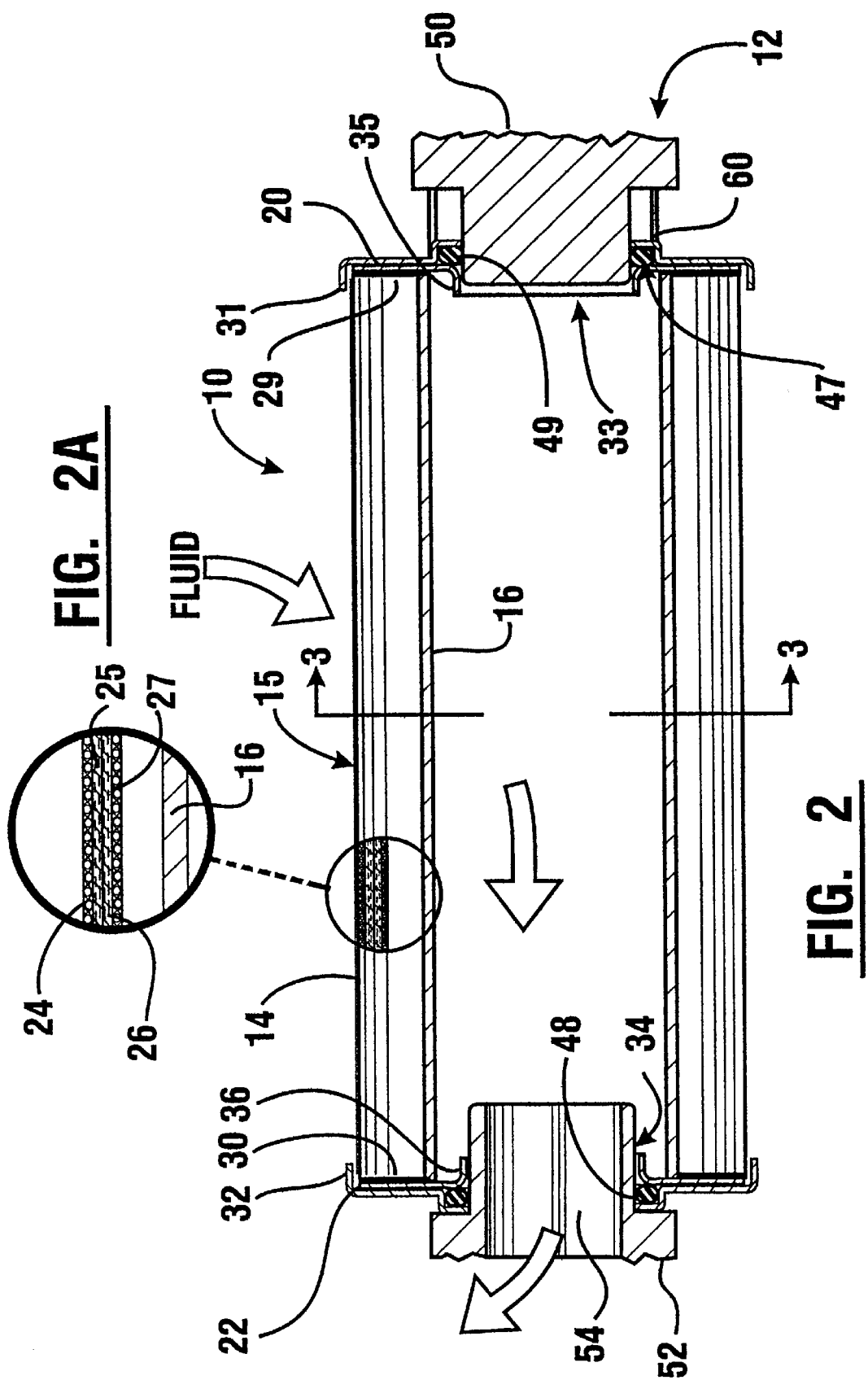

STATIC DISSIPATING FILTER CARTRIDGE WITH CONDUCTIVE RESILIENT SEAL

CROSS REFERENCE TO RELATED APPLICATION

This application is a continuation of copending International Application No. PCT/US96/09729 filed on Jun. 10, 1996 and which designated the United States, which claims benefit from application No. 60/002,432, filed Jul. 18, 1995.

FIELD OF THE INVENTION

The present invention relates generally to fluid filters, and more particularly to a filter which removes static electric charge from fluid passing through the filter.

BACKGROUND OF THE INVENTION

Filter apparatus are known for filtering particles in a fluid stream. The filtration operation essentially removes particles of a particular size from the fluid stream to cleanse the fluid stream of contaminants.

As the fluid flows through the filter apparatus, certain fluids such as hydraulic fluids and diesel and gasoline fuels can have resistance to the conductance of electricity. As such, a static charge can build up within the fluid from the action of the fluid flowing through the non-metallic piping and filter media. With some of the more advanced compositions of filter media, and with the increasing acceptance of synthetic and biodegradable fluids with low conductivity values (i.e., little or no metal additives), static charge can accumulate within the filter apparatus. When the potential between the fluid and a conductive housing component reaches a certain level, a spark can jump to a surface of the housing component. This can be undesirable in many situations.

One technique for removing the static charge in the fluid is to add an anti-static agent such as DuPont Stadis 450 to make the fluid slightly conductive. However, anti-static agents can lose potency over time and will typically have to be re-added (re-doped) to the fluid at regular intervals.

Certain filter apparatus are also known which attempt to remove static charge as fluid flows through the filter apparatus. For example, Patent Specification U.S. Pat. No. 3,933,643 to Colvin, et al., discloses a technique to remove static charge in filters for a flammable liquid or gas wherein nonconductive fibrous filter elements are treated with resins containing finely divided carbon. The treated fibers are then fabricated into filter elements which are electrically connected to metal end caps using a conductive sealing composition. The metal end caps are then electrically connected to ground. The static charge in the liquid or gas passing through the filter element is drawn off through the ground path. Patent Specification EP-A-0402657 and Patent Specification DE-C3325526 also show what appears to be conductive adhesive disposed between the end of filter media and an end cap.

Patent Specification U.S. Pat. No. 3,186,551 to Dornauf, shows a similar technique wherein a pair of conductive inner and outer perforated metal tubes surround the filter media, while a conductive wire helix is included within the filter media. The wire helix and metal tubes are electrically connected to metal disk members at either end of the filter element and then to metal annular members. One metal annular member is in direct mechanical contact with a central spindle which contacts a metal partitioning wall of the filter housing, while the other annular member is in direct mechanical contact with the metal partitioning wall.

Patent Specification U.S. Pat. No. 4,999,108 to Koch, et al., shows a similar technique where a wire electrically connects a perforated metal support tube intermediate the filter media with a metal fastening screw. The metal fastening screw is then grounded by direct mechanical contact with a metal fastening spider (housing).

Still another technique for grounding components within a filter apparatus is shown in Patent Specification U.S. Pat. No. 4,187,179 to Harms, wherein spring fingers are in direct mechanical contact with and electrically connect a metal support plate to a lid of the filter container.

Patent Specification WO-A-92/04097 shows a technique where the outer housing is formed from conductive material and attached to ground to dissipate charges generated by fuel passing through the filter media.

Patent Specification WO-A-87/01301 shows conductive filter media material electrically connected through conductive adhesive to a conductive end cap. The end cap is then attached by a conductor to ground.

While the above types of filter apparatus might be useful in certain situations, the applicants believe that the known filter apparatus can require special housing structures for the filter elements or additional parts such as spring fingers or spindles; require tight tolerances and/or intimate mechanical contact between the filter element and the housing; and can be difficult and time-consuming to assemble such that a proper ground path is provided and maintained between the filter element and the housing. Applicants believe that heretofore there has not been a filter apparatus which removes static charge from fluid and which (i) does not require any special housing structure other than what would normally be found with nonconductive filter apparatus, and (ii) is easy to assemble so as to provide and maintain a proper ground path between the filter element and the housing.

As such, applicants believe there is a demand for a new and improved filter element which addresses the above drawbacks.

SUMMARY OF THE INVENTION

The present invention provides a filter apparatus which dissipates static charge from fluid flowing through the apparatus and which has a filter element which can be easily assembled within a filter housing is provided without any additional structure beyond that which would typically be found with nonconductive filter elements. As an additional benefit, the filter element can be used in filter housings where static charge build-up is not an issue.

According to the principles of the present invention, the filter apparatus includes a filter housing supporting and enclosing a filter cartridge or element. The filter cartridge comprises a tubular filter media assembly which incorporates a conductive structure to draw off static charge in fluid passing through the media. The tubular filter media assembly preferably comprises an outer support layer formed from, e.g., epoxy coated steel mesh; a first intermediate layer comprising a fiberglass filtration layer; a second intermediate layer comprising, e.g., stainless steel, nickel or carbon fiber mesh, mat or matrix; and a inner support layer comprising, e.g., epoxy-coated steel mesh. The filter media assembly can be pleated and disposed around a central perforated conductive tube.

The filter media assembly is electrically connected through conductive adhesive or epoxy to at least one of the end caps for the filter assembly. One (or both) of the end caps has a central opening and is formed from conductive material. The opening in the end cap is designed to receive a portion of the grounded filter housing, for example an inlet tube. Conductive resilient material is disposed between the end cap and the portion of the filter housing extending through the opening. Preferably, the conductive resilient material comprises an elastomeric O-ring seal. The O-ring seal is in electrical contact with each end cap and with the filter housing portion. The O-ring seal can be located within a channel or groove surrounding the opening in an end cap to electrically connect (ground) the end cap to the housing portion.

The conductive elastomeric O-ring seal provides flexibility in allowing the filter element to be easily assembled with the filter housing and to create a proper ground path between an end cap and the filter housing without direct mechanical contact between the element and the housing. The conductive elastomeric O-ring seal thereby allows the tolerances in the opening in the end cap, and in the portion of the housing extending into the end cap, to vary to a greater extent while still maintaining the ground path. In addition, the conductive elastomeric seal does not require any additional assembly steps or modification of the filter housing, and can be used even when static charge build-up in the filter is not an issue.

According to an additional aspect of the present invention, a metal contact spring can be disposed around the portion of the housing extending into an end cap. The spring extends between the end cap and the housing and provides an additional or alternate ground path between the end cap and the filter housing.

Other features and advantages of the present invention should become further apparent from the following description and attached claims.

BRIEF DESCRIPTION OF THE DRAWINGS

FIG. 2 is a lengthwise sectional view of a filter apparatus constructed according to the present invention;

FIG. 2A is an enlarged sectional view of a portion of the filter apparatus of FIG. 2;

DETAILED DESCRIPTION OF THE PREFERRED EMBODIMENT

Figure 1:
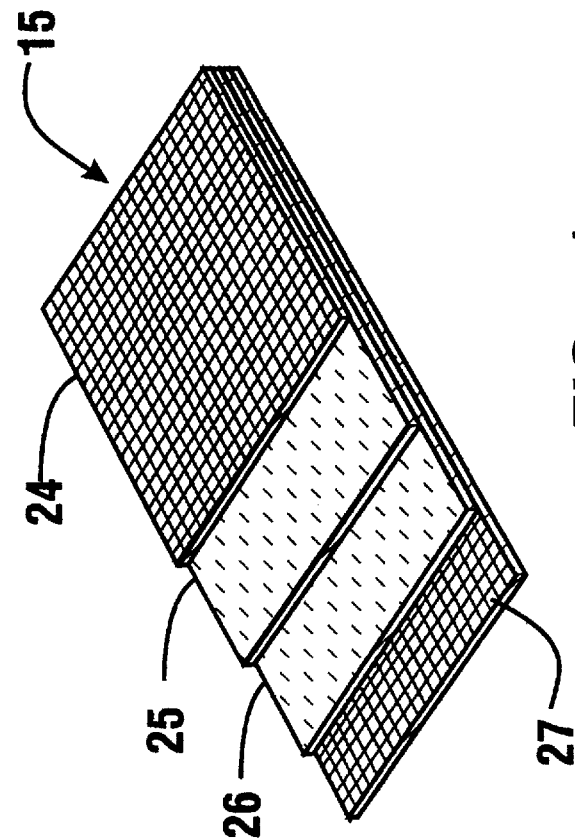
FIG. 1 is a perspective view of the layered construction of the filter media assembly of the present invention.

Referring to the drawings, a filter apparatus constructed according to the principles of the present invention is indicated generally at 10. The apparatus includes a filter housing, indicated generally at 12, and a filter cartridge or element 14. The filter housing 12 is of conventional design and supports the filter cartridge 14 along at least one end within the fluid system. The filter housing is grounded within the fluid system in a conventional manner.

The filter cartridge 14 comprises a filter media assembly, indicated generally at 15, disposed around a central perforated metal tube 16, and a pair of metal end caps 20, 22 disposed at opposite ends of the filter cartridge. Referring in particular to FIG. 1, the filter media assembly 15 preferably comprises a multi-layered structure having means for filtering fluid, and in particular hydraulic fluid, and for drawing off static charge in the fluid flowing through the filter cartridge. Preferably, this means includes an outer or upstream layer 24 of a support material. The upstream layer comprises an epoxy-coated steel mesh with a porosity chosen so as to allow substantially unimpeded fluid flow through the mesh while providing support for the underlying layers. Preferably, this layer has an 18×14 mesh count (18 wires per inch [2.5 cm] in the longitudinal direction and 14 wires per inch [2.5 cm] in the lateral direction).

This means also includes a first intermediate filtration layer 25 provided in surface-to-surface contact with the outer layer 24 on the downstream side of the outer layer 24. Filtration layer 25 preferably comprises a conventional high-efficiency microfiber media, such as fiberglass. Preferably, the filtration layer has an efficiency of two micrometers absolute.

The means further includes a second intermediate layer 26 provided in surface-to-surface contact with the filtration layer 25 on the downstream side of the filtration layer 25. The second intermediate layer is preferably a conductive layer formed from, e.g., a stainless steel, nickel or carbon fiber mesh, mat, or matrix, and is in thin sheet form. The porosity (efficiency) of the conductive layer 26 is preferably great enough to allow fluid to flow substantially unimpeded through the conductive layer, but is small enough to carry the charge away from fluid passing through the mesh. Preferably, the conductive layer has an efficiency of 40 micrometers absolute, and as such, is at least an order of magnitude less efficient than filtration layer 25. The efficiency of this layer can, of course, vary depending upon the particular static charge requirements.

Finally, the means also includes an inner or downstream support layer 27 provided in surface-to-surface contact with the downstream side of the conductive layer 26. The downstream support layer 27 preferably includes an epoxy-coated steel mesh having the same porosity as the outer layer 24, and which provides strength and integrity for the upstream layers. The various layers of the filter media assembly described above are preferably each of the same width and length such that the entire assembly is provided in a neat stack and can be easily manufactured, although as should be apparent, the thickness of the various layers can vary depending upon the particular application. In any case, it is important that the conductive layer 26 is accessible from at least one end of the filter media assembly.

Furthermore, while one filter media assembly is described above, it should be apparent to those skilled in the art that the structure of the filter media assembly can vary depending upon the filtration requirements and static charge built-up in the system. In fact, in its simplest sense, the present invention only requires a filter media assembly which includes (i) filtration media chosen so as to provide appropriate filtration efficiency, and (ii) a conductive structure associated with the filtration media which removes charge from fluid passing through the filtration media, and which has an electrical contact point which is accessible through the filtration media, for example along an end of the filtration media.

Figure 3:
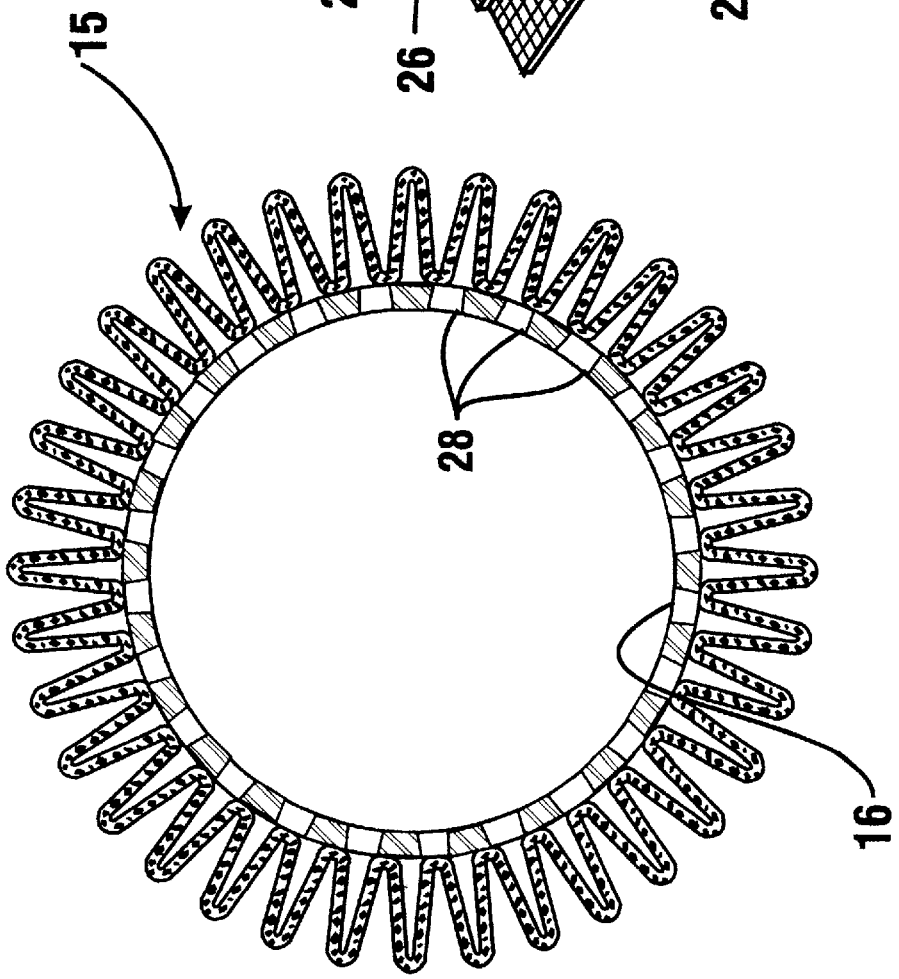
FIG. 3 is a cross-sectional end view of the filter media assembly taken substantially along the plane described by the lines 3—3 of FIG. 2.

The filter media assembly 15 is then disposed around the central perforated tube 16, as illustrated most clearly in FIG. 3. The central tube typically has rather large openings 28 (perforations) to allow the fluid to pass through the tube substantially unimpeded. Preferably, the filter media assembly 15 is initially pleated using conventional pleating equipment, and is then disposed around the center tube with the pleats extending longitudinally along the tube and projecting radially outward from the tube. The circumferential ends of the pleated filter media assembly could be attached together in a conventional manner, such as by an adhesive.

Of course, the filter media assembly 15 could also be unpleated and wrapped helically or spirally around the center tube, if desired.

Referring now to FIG. 2, the metal end caps 20 and 22 are located at opposite ends of the filter media assembly 15. Preferably, the end caps 20, 22 are each attached to the filter media assembly with a mass of conductive epoxy or adhesive, as indicated at 29, 30, respectively. The conductive epoxy or adhesive electrically connects the end caps to the filter media assembly, and in particular, electrically connects the end caps to the conductive layer 27. The conductive epoxy or adhesive also electrically connects the center metal tube 16 to the end caps. Each end cap 20, 22 preferably has a cup-shaped design with a peripheral annular flange 31, 32, respectively, which extends a short distance axially along the outer surface of the outer support material 24. Each end cap 20, 22 preferably has a central opening, indicated generally at 33, 34, respectively, defined by an inwardly-turned annular flange 35, 36, respectively, however, one end cap could also be formed without an opening, as will be described herein in more detail.

Figure 4:
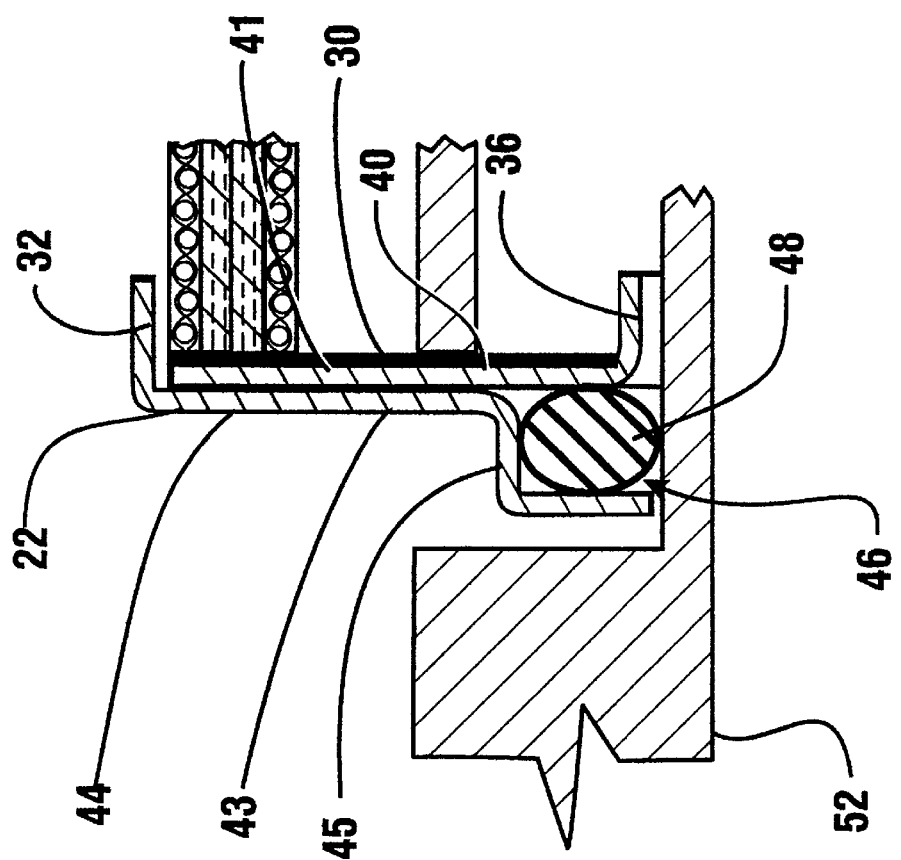
FIG. 4 is an enlarged sectional view of the conductive O-ring seal and associated assembly at one end of the filter apparatus.

Preferably each end cap comprises a multi-piece structure. For example, as illustrated in FIG. 4, end cap 22 preferably comprises an inner cap member 40 which includes, as an integral piece, flat base 41, and the inner annular flange 36. End cap 22 also includes an outer cap member 43 which includes, as an integral piece, a flat base 44, the outer annular flange 32, and an "L" shaped annular flange 45 which forms an annular (C-shaped) channel or groove, indicated generally at 46, with the inner cap member 40. End cap 20 (FIG. 2) has substantially the same structure as end cap 22, and also forms an annular C-shaped channel or groove, indicated generally at 47.

A conductive resilient material is disposed within the channel in each end cap. For example, a conductive resilient material 48 is disposed in channel 46 in end cap 22, and a conductive resilient material 49 is disposed in channel 47 in end cap 20. The conductive resilient materials 48, 49 are each preferably conductive elastomeric O-ring seals. Each seal 48, 49 has a dimension which is slightly larger than the dimension of the respective channel in which it is located, such that each seal is retained in and slightly protrudes from the channel.

The seals 48, 49 can be comprised of an elastomer such as a silicone or fluorosilicone polymer infused with a high density conductive filler to create an electric path. Conductive fillers can comprise graphite, copper, or other metallic fillers, as should be known to those skilled in the art. One conductive elastomer appropriate for the present invention is available from the Parker Seal Division of the assignee of the present invention under the mark PARSHIELD CONDUCTIVE ELASTOMER. Of course, other conductive elastomers can be used with the present invention.

In any case, the filter media assembly 15, center tube 16, end caps 20 and 22, and conductive elastomer seals 48, 49 are initially assembled together as the filter cartridge. The structure of the filter cartridge is such that fluid is directed radially inward through the outer layer, passes through the first intermediate layer, passes through the second intermediate layer, and then passes through the inner layer, in succession. It should also be apparent to those skilled in the art that the flow could also be reversed, i.e., pass radially outward through the filter media assembly. In this instance, it is preferred that the location of the conductive layer 26 and filtration layer 25 be reversed, i.e., that the conductive layer 26 be disposed on the outer downstream side of the filtration layer 25. In other words, it is preferred that the conductive layer 26 be on the downstream side of the filtration layer 25.

The cartridge is then disposed within the filter apparatus, such as by locating the cartridge over opposite portions of a grounded filter housing, such as indicated at 50, 52 in FIG. 2. One of the filter housing portions, for example portion 52, can be an inlet pipe to the fluid system and can thereby have a central inlet bore 54, while the other filter housing portion 50 can comprise a solid cylinder. Preferably both filter housing portions 50, 52 are grounded, although it is only necessary to have one grounded. In any case, the filter housing portions 50, 52 are received within the central openings 33, 34 formed in the end caps of the filter cartridge. The filter cartridge receives the portions of the filter housing with the conductive elastomeric seals 48, 49 sealing against the periphery of the filter housing portions. As should be apparent, the cartridge is uniquely suited to be used as a replaceable element, however, the cartridge can also be used as a non-replaceable element.

The conductive seals provide a ground path between the filter cartridge and the housing portions, as well as provide a fluid tight seal against the filter housing. Any static charge build-up in the filter media assembly 15 is conducted from the filtration layer 25 to the conductive layer 26 because of their adjacent proximity to each other, passes through the conductive epoxy 29, 30 to the conductive end caps 20, 22, and then passes through the conductive elastomeric seals 48, 49 to the grounded filter housing portions, thus dissipating any charge received from the fluid passing through the apparatus. The downstream location of the conductive layer 26 has been determined to satisfactorily carry away charge from the upstream adjacent filtration layer 25.

While the present invention has been described above with respect to a pair of end caps, each of which has a central opening to receive a filter housing portion such that a ground path is provided through both ends of the filter cartridge, it should be apparent to those skilled in the art that the charge in the fluid could be dissipated using a single ground path through only one end cap of the filter assembly. In this case, only one end cap can include a central opening to receive a housing portion. The other end cap can be a solid disk and not receive a housing portion, or can receive a housing portion but have a non-conductive seal or be formed from non-conductive material.

Additionally or alternatively, although not preferred, a conductive metal spring, indicated generally at 60, can also be provided around one (or both) housing portions 50, 52. Spring 60 provides another flexible ground path from filter media assembly 15 to the housing 12 by contact with the conductive end caps. Spring 60 also provides a bias on the filter element to prevent the filter element from vibrating or moving axially back-and-forth on the housing portions.

The filter apparatus with conductive elastomeric seal(s) described above provides a filter element which can be easily assembled with the housing portions to create a ground path without requiring direct mechanical contact with the filter housing. The conductive seals provide the ground path to the housing portions regardless of the relative axial positioning between the filter element and the housing portions. That is, there is flexibility in locating the filter cartridge on the housing portions without worrying about direct, intimate contact with the end caps of the filter cartridge because of the resiliency of the seals. As such, the tolerances between the filter element and the housing can vary to a greater degree while still maintaining the proper ground path. Moreover, because the conductive seals are carried on the filter element, the present invention does not require any modification of the filter housing or additional assembly steps. Even if the fluid flowing through the filter apparatus does not have static charge, the filter element of the present invention provides filtering of the fluid to maintain the fluid at an appropriate cleanliness.

What is claimed is:

1. A filter cartridge for filtering particulates from fluid in a fluid system, said filter cartridge comprising:

filtration means comprising filtration media for providing a predetermined particle filtration efficiency and conductive media for drawing off static charge in the fluid, conductive end cap means bonded to and supporting at least one end of said filtration means, said end cap means having a central opening for receiving a tubular housing portion in the fluid system, conductive resilient elastomeric O-ring sealing means retained and supported by said end cap means and bounding said central opening, said sealing means projecting radially inward of the central opening for sealing against the tubular housing portion, said sealing means in electrically-conductive relationship with said conductive media for providing a ground path from said conductive media to the housing portion, wherein fluid directed through said cartridge passes initially through the filtration media and then through the conductive media and static charge in the fluid can be dissipated through the ground path, and a conductive adhesive mass bonding the end cap means to the filtration means, the conductive adhesive mass in electrically-conductive relation with said conductive media and the conductive end cap means.

2. The cartridge as in claim 1, wherein said conductive end cap means comprises a pair of end caps, both of which are formed of conductive material and are in electrically-conductive relation with the conductive media and the conductive resilient sealing means.

3. The cartridge as in claim 1, wherein said filtration means includes i) a first layer of filtration media in tubular form, said first layer of filtration media having a predetermined particle filtration efficiency, and ii) a second layer of a conductive mesh, matrix or mat in tubular form arranged adjacent to and concentric with said first layer, said second layer having a particle filtration efficiency which is less than said first layer.

4. The cartridge as in claim 3, wherein said first filtration layer is disposed radially outward from the second conductive layer.

5. The cartridge as in claim 4, further characterized as including a second support layer disposed radially inward from the second conductive layer, a third support layer disposed radially outward from the first filtration layer, and a conductive perforated tube located centrally within the first filtration layer, second support layer, third support layer and second conductive layer.

6. The cartridge as in claim 5, wherein said first filtration layer, second and third support layers, and second conductive layer are pleated together and disposed around the central perforated tube.

7. The cartridge as in claim 1, further including a first conductive end cap bonded to and supporting a first end of said filtration means and a first conductive resilient O-ring sealing member carried by said first end cap in electrically-conductive relationship with said conductive media to provide a first ground path to the housing member, and a second conductive end cap bonded to and supporting a second end of said filtration means and a second conductive resilient O-ring sealing member carried by said second end cap in electrically-conductive relationship with said conductive media to provide a second ground path to the housing member.

8. The filter cartridge as in claim 1, wherein said conductive end cap means includes a conductive annular inner cap member bonded to said at least one end of the filtration means, and an annular outer cap member in face-to-face relation with the inner cap member and which together with the inner cap member forms a channel or groove for the resilient sealing means.

9. The filter cartridge as in claim 1, wherein said conductive end cap means includes an annular channel facing radially inward into the central opening, and the conductive resilient sealing means is retained and supported in the channel.

10. A filter assembly for filtering particulates from fluid, said filter assembly including:

a housing for receiving a filter cartridge, said housing including a conductive tubular housing portion, a filter cartridge disposed in the housing said filter cartridge having i) filtration means comprising filtration media for providing a predetermined particle filtration efficiency and conductive media for drawing off static charge in the fluid, (ii) conductive end cap means bonded to and supporting at least one end of said filtration means, said end cap means having a central opening for receiving the tubular housing portion, and (iii) conductive resilient sealing means retained and supported by said end cap means and bounding said central opening and sealing against the tubular housing portion in conductive relationship therewith, said sealing means in electrically-conductive relationship with said conductive media for providing a ground path from said conductive media to the housing portion, wherein fluid directed through said cartridge passes initially through the filtration media and then through the conductive media and static charge in the fluid can be dissipated through the ground path.

11. A filter cartridge for filtering particulates from fluid in a fluid system, said filter cartridge comprising:

a tubular filtration media assembly circumscribing a central axis comprising filtration media having a predetermined particle filtration efficiency and conductive structure associated with the filtration media which can draw off static charge in the fluid, a conductive annular end cap bonded to and supporting one end of said filtration media assembly, said end cap having a central, circular opening coaxial with the central axis and through which a tubular housing portion can be inserted, a conductive resilient annular seal retained and supported by said end cap and bounding said central opening, said seal projecting radially inward of the end cap into the central opening toward the central axis for sealing against the tubular housing portion, said seal in electrically-conductive relationship with said conductive structure, wherein fluid directed through said cartridge passes initially through the filtration media and conductive structure and static charge in the fluid can be dissipated through the conductive structure to the conductive resilient seal, and a conductive adhesive mass disposed between and in electrically conductive relation with the conductive structure and said conductive end cap.

12. The filter media as in claim 11, wherein said conductive structure comprises a media having a predetermined particle filtration efficiency which is less than the particle filtration efficiency of said filtration media.

13. The filter cartridge as in claim 11, wherein said end cap is formed entirely of conductive material.

14. The filter cartridge as in claim 11, wherein said conductive resilient seal is a conductive elastomer.

15. The filter cartridge as in claim 11, wherein the filtration media assembly has i) a first layer of filtration media in tubular form, and ii) a second layer of a conductive media in tubular form arranged adjacent to and concentric with said first layer, said second layer of conductive media having a particle filtration of efficiency less than said first layer, the first conductive end cap in electrically conductive relationship with said second layer, said seal in electrically conductive relationship with the first end cap for providing a ground path from said second layer to the sealing member, wherein fluid directed through said cartridge passes initially through the first filtration layer and then through the second conductive layer and any static charge in the fluid is dissipated through the ground path.

16. The cartridge as in claim 15, wherein said resilient sealing member comprises a conductive elastomeric O-ring seal.

17. The cartridge as in claim 15, further including a second conductive end cap bonded to and supporting said filtration media assembly and in electrically conductive relationship with said second layer, said second end cap also having a central opening, and a second conductive resilient sealing member retained and supported by the second end cap and bounding said central opening in the second end cap, said second sealing member in electrically conductive relation with said second end cap for providing a second ground path from the second layer to the second sealing member.

18. The cartridge as in claim 17, wherein said first and second resilient sealing members each comprise conductive elastomeric O-ring seals.

19. The cartridge as in claim 15, wherein said first filtration media layer is arranged in surface-to-surface contact with said second conductive media layer.

20. The cartridge as in claim 15, wherein said first filtration layer is disposed radially outward from the second conductive layer.

21. The cartridge as in claim 20, further including a second support layer disposed radially inward from the second conductive layer, a third support layer disposed radially outward from the first filtration layer, and a conductive perforated tube located centrally within the second support layer.

22. The cartridge as in claim 21, wherein said first filtration layer, second conductive layer, and second and third support layers are pleated together and disposed around the central perforated tube.

23. The cartridge as in claim 15, wherein said second conductive layer is a thin sheet of a conductive material in mesh, mat or matrix form.

24. The cartridge as in claim 15 wherein said first conductive end cap is formed entirely from a conductive material.

25. The filter cartridge as in claim 15, wherein said first conductive end cap includes a conductive annular inner cap member bonded to said at least one end of the filtration means, and an annular outer cap member in face-to-face relation with the inner cap member and which together with the inner cap member forms the channel or groove for the resilient sealing member.

26. The filter cartridge as in claim 15, wherein said first conductive end cap includes an annular channel facing radially inward into the central opening, and the conductive resilient sealing member is retained and supported in the channel.

27. The filter cartridge as in claim 11, wherein said conductive end cap includes an annular channel facing radially inward into the central opening, and the conductive resilient seal is retained and supported in the channel.

28. A filter assembly for filtering particulates from a fluid, said filter assembly comprising:

a housing for receiving a removable filter cartridge, said housing including a tubular housing portion, and a filter cartridge disposed in the housing, said filter cartridge including a filter media assembly having i) an outer layer of filtration media in tubular form, said outer layer of filtration media having a predetermined particle filtration efficiency, and ii) an inner layer of a conductive media in tubular form arranged adjacent to and concentric with said outer layer, said inner layer of conductive media having a particle filtration efficiency which is less than said outer layer, a pair of end caps supporting said filtration media assembly, at least one of said end caps being conductive and having an opening receiving said tubular housing portion, and a conductive resilient sealing member retained and supported by said at least one end cap and bounding said central opening in sealing engagement with said tubular housing portion, said conductive resilient sealing member providing a ground path from said inner layer to the housing portion, the fluid being directed through said cartridge such that the fluid passes through the outer layer and then through the inner layer and static charge in the fluid is dissipated through the ground path.

29. The filter assembly as in claim 28, wherein both of the end caps are conductive and said other end cap includes another opening receiving another tubular housing portion of the fluid system, and further including a second conductive resilient sealing member carried by the other end cap and bounding the other opening for sealing against the other tubular housing portion, said second resilient sealing member providing a second ground path from said inner layer to the other housing portion.

30. The filter assembly as in claim 28, further including a conductive spring received around the tubular housing portion and extending between the housing portion and the at least one end cap.

31. The filter assembly as in claim 28, further including a mass of conductive adhesive disposed between said at least one end cap and said filter media assembly for bonding said at least one end cap to said filter media assembly.

32. A filter cartridge for filtering particulates from fluid in a fluid system, said filter cartridge comprising:

a filtration media assembly comprising tubular filtration media having a predetermined particle filtration efficiency and conductive structure associated with the filtration media, said conductive structure in electrically-conductive relation with fluid passing through passing through the filter cartridge, wherein said tubular filtration media circumscribes a central axis, an annular end cap bonded to and supporting one end of said filtration media assembly, said end cap having a central circular opening coaxial with the central axis and through which a tubular housing portion can be inserted, a conductive resilient annular seal retained and supported by said end cap and bounding said central opening, said seal projecting radially inward of the end cap into the central opening toward the central axis for sealing against the tubular housing portion, said seal in electrically-conductive relationship with said conductive structure, wherein fluid directed through said cartridge passes through the filtration media and conductive structure and charge can be transferred between the fluid and said resilient seal, and a conductive adhesive mass disposed between the conductive structure and said end cap and in electrically conductive relation with the conductive structure.

33. The filter cartridge as in claim 32, wherein said end cap provides a conductive path between said resilient seal and said conductive structure.

34. The filter cartridge as in claim 33, wherein said end cap is formed from conductive material.

35. The filter cartridge as in claim 34, wherein said seal is a conductive elastomeric seal, supported within a groove formed in said end cap.

36. The filter cartridge as in claim 32, wherein said end cap includes an annular channel facing radially inward into the central opening, and the conductive resilient seal is retained and supported in the channel.

37. The filter cartridge as in claim 32, wherein said end cap includes a conductive portion, and the conductive adhesive mass is in electrically-conductive relation with said conductive structure and the end cap.

38. A filter cartridge for filtering particulates from fluid in a fluid system, said filter cartridge comprising:

a filtration media assembly comprising tubular conductive filtration media defining a central cavity and circumscribing a central axis, said tubular conductive filtration media in electrically-conductive relation with fluid passing through the filter cartridge, an end cap having an annular portion supporting one end of said filtration media assembly, said annular portion permanently fixed to said filtration media assembly with a conductive adhesive mass, wherein said conductive adhesive mass is in electrically conductive relation with the tubular filtration media, said annular portion of said end cap having an inner diameter defining a central opening coaxial with the central asix, and an outer diameter, and an annular groove in the end cap located exterior to the central cavity in the filter element and spaced inward from said outer diameter, a conductive resilient annular seal supported within the groove in the end cap and located for sealing against a housing, said annular seal in electrically-conductive relationship with said tubular conductive filtration media through said conductive adhesive mass and a conductive path through the end cap electrically connecting the conductive adhesive mass and the annular seal, wherein the fluid directed through said cartridge passes through the tubular conductive filtration media, and charge can be transferred between the fluid and said resilient annular seal through said tubular conductive filtration media, said conductive adhesive mass and said conductive path.

39. The filter cartridge as in claim 38, wherein said filtration media assembly includes a first layer of filtration media in tubular form, and a second layer of conductive mesh, matrix or mat in tubular form arranged adjacent to an concentric with said first layer.

40. The filter cartridge as in claim 38, wherein said end cap includes conductive material, and charge can be transferred between said fluid and said resilient annular seal through siad tubular conductive filtration media and said conductive end cap.

41. The filter cartridge as in claim 38, wherein said seal is a conductive elastomer.

42. The filter cartridge as in claim 38, wherein the annular groove in the end cap faces radially inward toward the central axis of the filtration media assembly.

43. The filter cartridge as in claim 42, wherein said annular seal projects radially inwardly of the central opening in the end cap toward the central axis for sealing against the housing.

44. A filter assembly for filtering particulates from fluid in a fluid system, said filter assembly comprising:

a housing for receiving a removable filter cartridge, a filtration media assembly disposed in said housing, said filtration media assembly comprising tubular conductive filtration media circumscribing a central axis and having a predetermined particle filtration efficiency, said tubular conductive filtration media in electrically-conductive relation with fluid passing through the filtration media, an end cap having an annular portion fixed to and supporting one end of said filtration media assembly, said end cap having a central opening coaxial with the central axis for receiving a portion of the housing, a conductive resilient annular seal supported between the housing and the annular end cap to provide a fluid-tight seal therebetween, said annular seal in electrically-conductive relationship with said tubular conductive filtration media and with said housing, and a conductive path through the end cap electrically connecting the tubular conductive filtration media and the annular seal, wherein fluid directed through said cartridge passes through the tubular conductive filtration media, and charge can be transferred between the fluid and said housing through said tubular conductive filtration media, said conductive path, and said resilient annular seal.

45. The filter assembly as in claim 44, wherein said annular portion of the end cap is permanently fixed to said one end of said filtration media assembly and in fluidly-sealed relation with said filtration media.

46. The filter assembly aas in claim 45, wherein a conductive mass is disposed between the tubular conductive filtration media and said annular portion of the end cap to fix the end cap to the filtration media assembly, said conductive mass in electrically conductive relation with the tubular conductive filtration media.

47. The filter assembly as in claim 46, wherein the conductive mass is a conductive adhesive.

48. The filter assembly as in claim 44, wherein said filtration media assembly includes a first layer of filtration media in tubular form, and a second layer of a conductive mesh, matrix or mat in tubular form arranged adjacent to and concentric with said first layer.

49. The filter assembly as in claim 44, wherein said end cap includes conductive material, and charge can be transferred between said fluid and said resilient annular seal through said tubular conductive filtration media and said conductive end cap.

50. The filter assembly as in claim 44, wherein said seal is a conductive elastomer.

51. The filter assembly as in claim 44, wherein the housing includes a tubular portion, the tubular portion of the housing being received in the central opening of the end cap.

52. The filter assembly as in claim 44, wherein sad annular seal is located between the annular end cap and the portion of the housing received in the central opening of the end cap.

53. The filter assembly as in claim 44, wherein said end cap includes an annular groove receiving the annular seal.

54. The filter assembly as in claim 53, wherein the annular groove in the end cap faces radially inward toward the central axis of the filtration media assembly.

55. The filter assembly as in claim 54, wherein said annular seal projects radially inwardly of the central opening in the end cap toward the central axis to provide a fluid-tight seal against the housing.

* * * * *